(12) United States Patent
Dine (10) Patent No.: US 7,090,583 B1
(45) Date of Patent: Aug. 15, 2006

(54) HIGH ANGLE CONSTANT VELOCITY JOINT

(75) Inventor: Donald W. Dine, Rochester Hills, MI (US)

(73) Assignee: GKN Driveline North America, Inc., Auburn Hills, MI (US)

(*) Notice: Subject to any disclaimer, the term of this patent is extended or adjusted under 35 U.S.C. 154(b) by 17 days.

(21) Appl. No.: 10/970,106

(22) Filed: Oct. 21, 2004

Related U.S. Application Data (63) Continuation of application No. 10/294,197, filed on Nov. 14, 2002, now Pat. No. 6,817,950.

(51) Int. Cl.
*F16D 3/224* (2006.01)
(52) U.S. Cl. .................................... 464/145; 464/906
(58) Field of Classification Search ............... 464/145, 464/146, 175, 906
See application file for complete search history.

(56) References Cited

U.S. PATENT DOCUMENTS 5,647,801 A * 7/1997 Jacob .......................... 464/145
6,280,337 B1 8/2001 Wormsbaecher et al.
6,461,244 B1 10/2002 Meyer et al.
6,709,337 B1 * 3/2004 Krude ........................ 464/145

OTHER PUBLICATIONS

SAE Universal Joint and Driveshaft Design Manual, AE-7, Society of Automotive Engineers, Inc., Warrendale, PA, pp. 167-170, TJ1079.S62 1979.*

* cited by examiner

*Primary Examiner*—Greg Binda
(74) *Attorney, Agent, or Firm*—Jennifer M. Brumbaugh; Mick A. Nylander (57) ABSTRACT

A constant velocity joint is provided that includes an outer race having a bore with an inside surface, a cage arranged within the bore of the outer race, an inner race having an outer surface; and a plurality of balls arranged within the cage. A shaft is connected to the inner race. The cage remains in a non-contacting state with said outer race through a zero angle and a high angle position of the shaft.

10 Claims, 10 Drawing Sheets

HIGH ANGLE CONSTANT VELOCITY JOINT

RELATED APPLICATIONS

This application is a continuation of U.S. patent application Ser. No. 10/294,197 filed on Nov. 14, 2002, now U.S. Pat. No. 6,817,950.

BACKGROUND

Constant velocity joints (CV joints) are common components in automotive vehicles. Typically, constant velocity joints are employed where transmission of a constant velocity rotary motion is desired or required. Common types of constant velocity joints are a plunging tripod, a fixed tripod, a plunging ball joint, and a fixed ball joint. These joints can be used in front wheel drive vehicles, or rear wheel drive vehicles and on the propeller shafts found in rear wheel drive, all wheel drive and four wheel drive vehicles. The plunging constant velocity joints allow for axial movement during operation without the use of slip splines, but sometimes initiate forces that result in vibration and noises. Plunging-type CV joints allow angular displacement along with the axial displacement along two axes thereof. The fixed type constant velocity joints generally only allow angular displacement between two axes. The fixed constant velocity joints are better situated for higher operating angles than that of a plunging type constant velocity joint. All of these constant velocity joints are generally grease lubricated for life and sealed by a sealing boot when used on propeller shafts. Thus, the constant velocity joints are sealed in order to retain grease inside the joint while keeping contaminates and foreign matter, such as dirt and water, out of the joint. The sealing protection of the constant velocity joint is necessary because contamination of the inner chambers causes internal damage and destruction of the joint which increases heat and wear on the boot, thus possibly leading to premature boot and grease failures and hence failure of the overall joint. The problem of higher temperatures in high speed fixed constant velocity joints is greatly enhanced at the higher angles. Thus, the increased temperatures and increased stresses on the boot caused by higher angles may result in premature failures in conventional constant velocity joints.

Generally, conventional fixed-type constant velocity joints included a bulky and heavy outer race having a spherical inner surface with a plurality of grooves. The joints also include an inner race, having a spherical outer surface with grooves formed therein. Many conventional fixed type constant velocity joints use six torque transmitting balls, which are arranged between the grooves of the outer and inner races of the constant velocity joint by a cage retainer. The balls allow a predetermined displacement angle to occur through the joint and thereby transmit a constant velocity rotary motion through the shafts of the automotive driveline system.

SUMMARY

The present invention provides a constant velocity joint that includes an outer race having a bore with an inside surface, a cage arranged within the bore of the outer race, an inner race having an outer surface; and a plurality of balls arranged within the cage. A shaft is connected to the inner race. The cage remains in a non-contacting state with said outer race through a zero angle and a high angle position of the shaft.

DETAILED DESCRIPTION

Referring to the drawings, a constant velocity joint 30 according to the present invention is shown. It should be noted that any type of constant velocity joint, such as a plunging tripod, a fixed tripod, and the like may incorpate some or all of the various features of the present invention described herein. In one embodiment, the constant velocity joint 30 according to the present invention generally is a high angle, high speed, ball-type fixed constant velocity joint for use on propeller shafts or driveshafts. The high angle can be defined as anything greater than or equal to nine degrees. These high angle joints tend to operate at high speeds and high temperatures.

A typical driveline for an all wheel drive vehicle includes a plurality of constant velocity joints 30. However, it should be noted that the present invention can also be used with rear wheel drive only vehicles, front wheel drive only vehicles, all wheel drive vehicles, and four wheel drive vehicles. Generally, a driveline includes an engine that is connected to a transmission and a power takeoff unit. A front differential may have a right hand side shaft and a left hand side shaft, each of which are connected to a wheel and deliver power to the wheels. On both ends of the right hand front side shaft and left hand front side shaft are constant velocity joints. A propeller shaft connects the front differential and the rear differential to the transfer case or power take-off unit. The rear differential may include a right hand rear side and a left hand rear side shaft, each of which ends with a wheel on an end thereof. Generally, a CV joint is located on both ends of the half shaft that connect to the wheel and the rear differential. The propeller shaft generally may be a multi-piece propeller shaft that includes a plurality of Carden joints and/or high speed constant velocity joints 30. The constant velocity joints 30 transmit power to the wheels through the drive shaft even if the wheels or the shaft have changing angles due to steering, raising or lowering of the suspension of the vehicle, etc. The constant velocity joint 30 may be of any of the standard types known, such as plunging tripod, a cross groove joint, a fixed joint, or a fixed tripod joint all of which are commonly known terms in the art for different varieties of constant velocity joints. The constant velocity joints allow for transmission of constant velocities at a variety of angles which are found in everyday driving of automotive vehicles on both the half shafts and propeller shafts of these vehicles.

Figure 1:
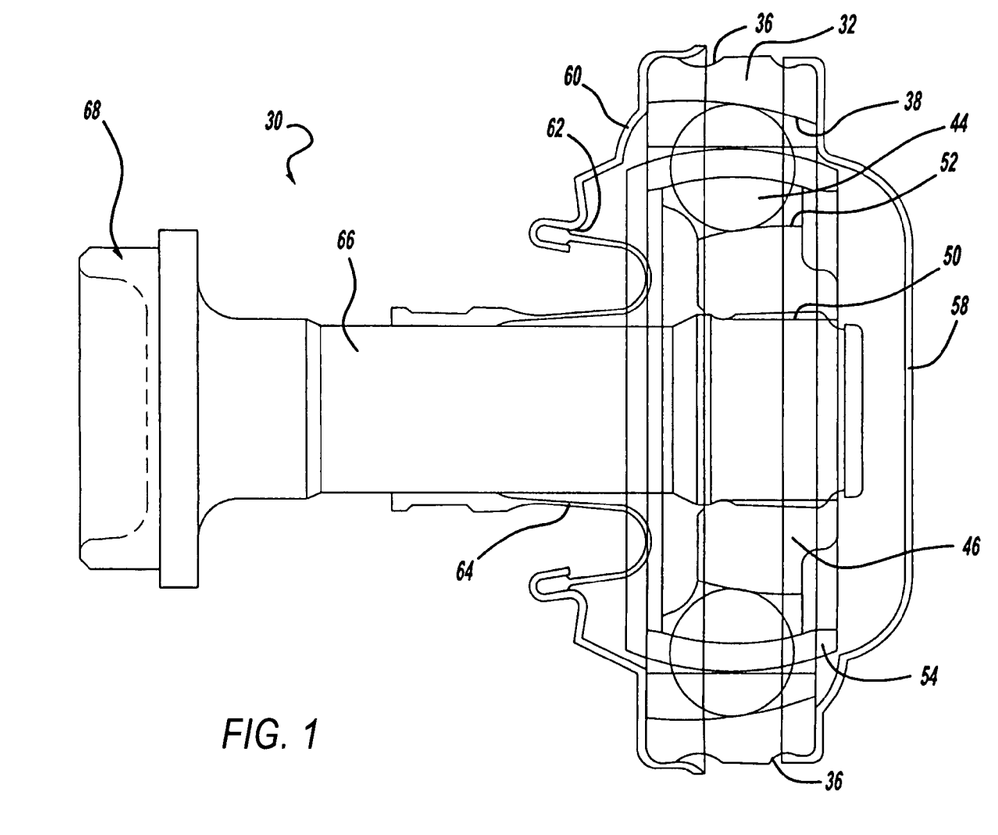
FIG. 1 shows a side view of a constant velocity joint according to the present invention.
Figure 2:
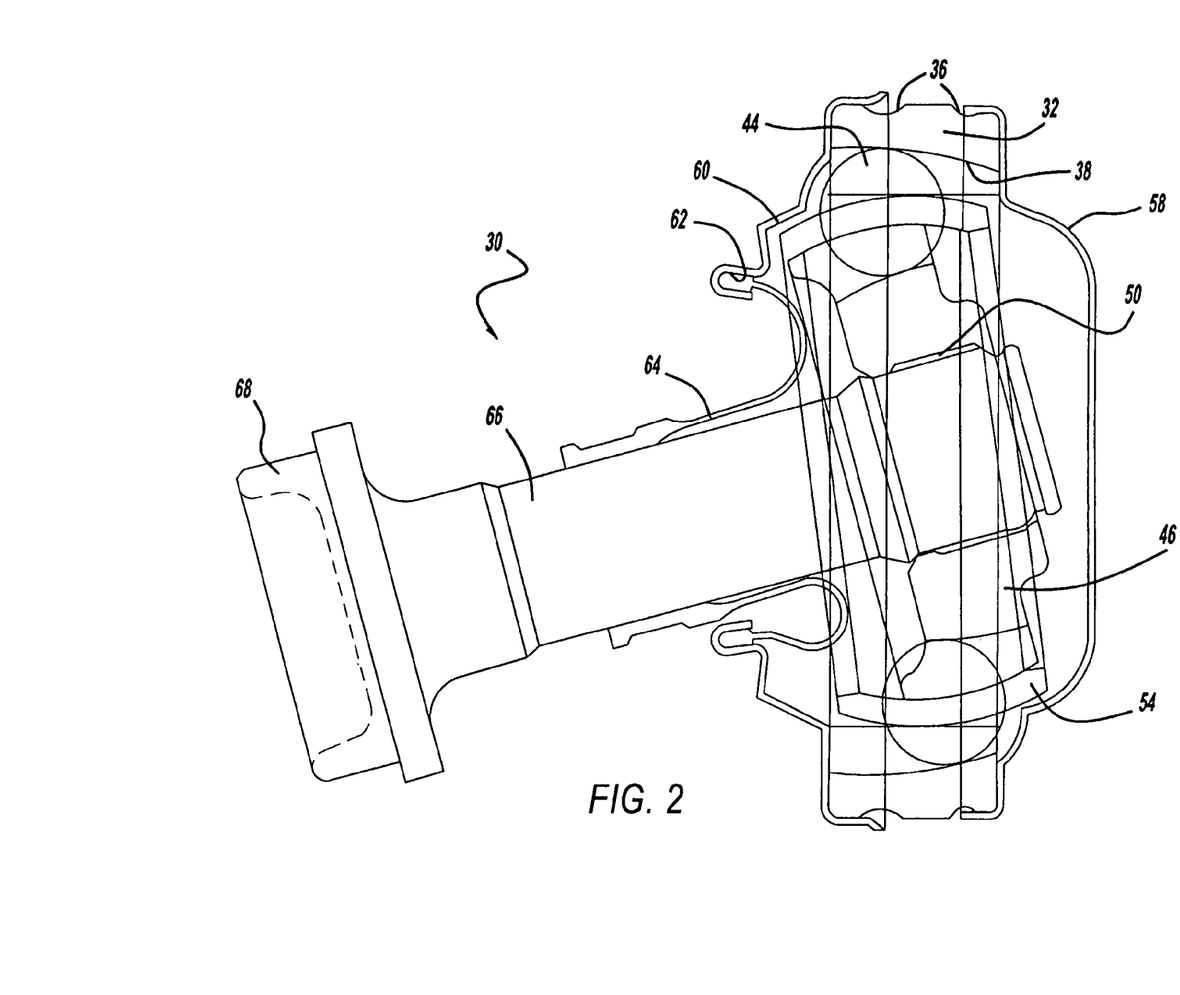
FIG. 2 shows a side view of a constant velocity joint articulated to a predetermined angle according to the present invention.
Figures 16, 17:
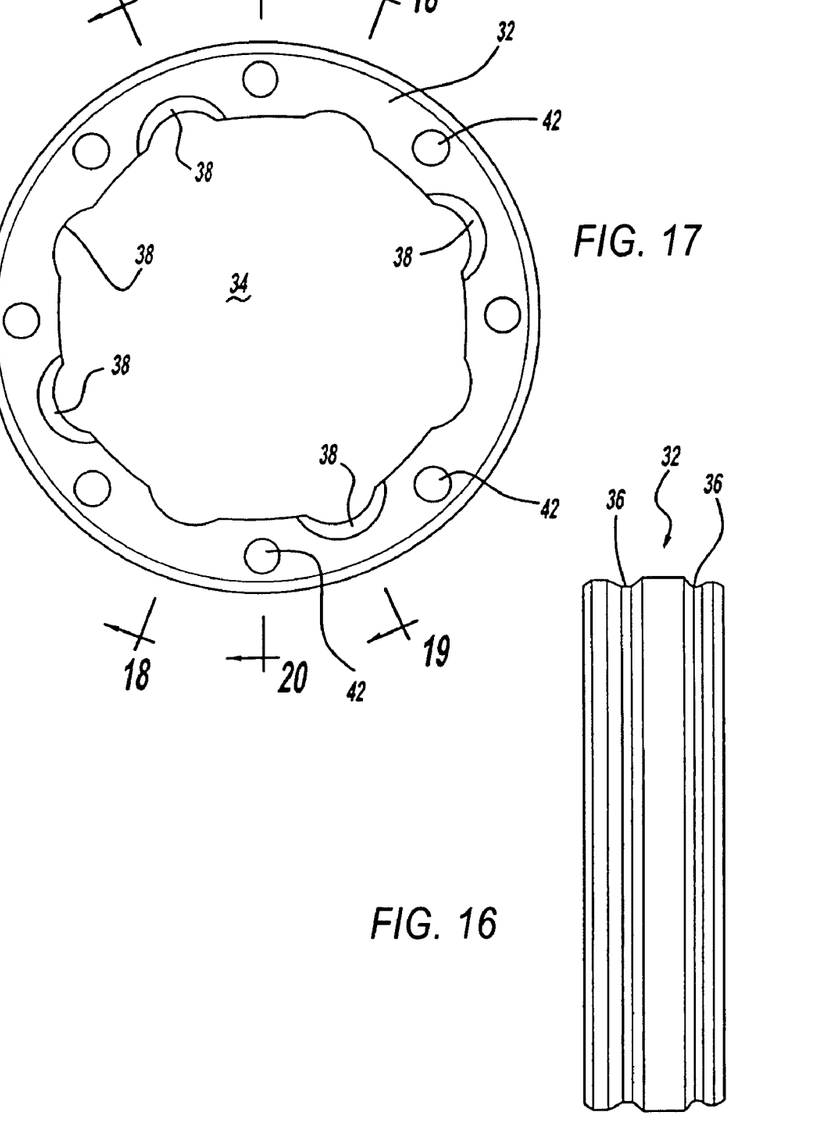
FIG. 16 shows a side view of an outer race according to the present invention.
FIG. 17 shows a top view of an outer race according to the present invention.

FIGS. 1 through 23 shows one embodiment of the present invention. A high speed, high angle constant velocity joint 30 is generally shown in FIGS. 1 and 2. The constant velocity joint 30 includes an outer race 32 generally having a circumferential shaped bore 34 (e.g., see FIG. 17) therethrough. The outer race 32 generally has a ring like appearance. On an outer surface of the constant velocity joint outer race 32 is located at least one circumferential channel 36 around the entire outer periphery of the outer race 32. The outer race 32 also includes a plurality of mounting orifices 42 equidistantly located around an outer periphery thereof. The outer race 32 is generally made of a steel material, however it should be noted that any other type of metal material, hard ceramic, plastic, composite material, and the like may also be used for the outer race 32. The material is preferably able to withstand the high speeds, temperatures and contact pressures of the constant velocity joint 30. The outer race 32 also includes a plurality of axially opposed ball tracks 38 located on an inner surface thereof. The tracks 38 are axially opposed such that one half of the ball tracks 38 open to a side of the outer race 32 opposite to that of the other half of the ball tracks 38. Therefore, the axial slope of the ball tracks 38 lay opposite to one another in the axial direction in an alternating pattern in this one embodiment. This will ensure a decrease in cage forces, a reduction of at least one of the guidance spheres and will also improve the efficiency and thermal characteristics of the constant velocity joint 30. In the present invention, the ball tracks 38 may also be of a gothic or elliptical shape provided pressure angle and conformity are maintained.

It should be noted that, in one embodiment, the constant velocity joint outer race 32 is thinner than the outer races of conventional constant velocity joints. This will help reduce the weight of the outer race 32 while also reducing the package size of the constant velocity joint 32. In one embodiment, the outer race 32 is approximately twenty four mm in thickness, but may be any width less than one hundred fifty mm for a disc style joint but may be much greater than that for a monoblock style joint depending on the design requirements for the automotive vehicle.

Figures 18, 19, 20:
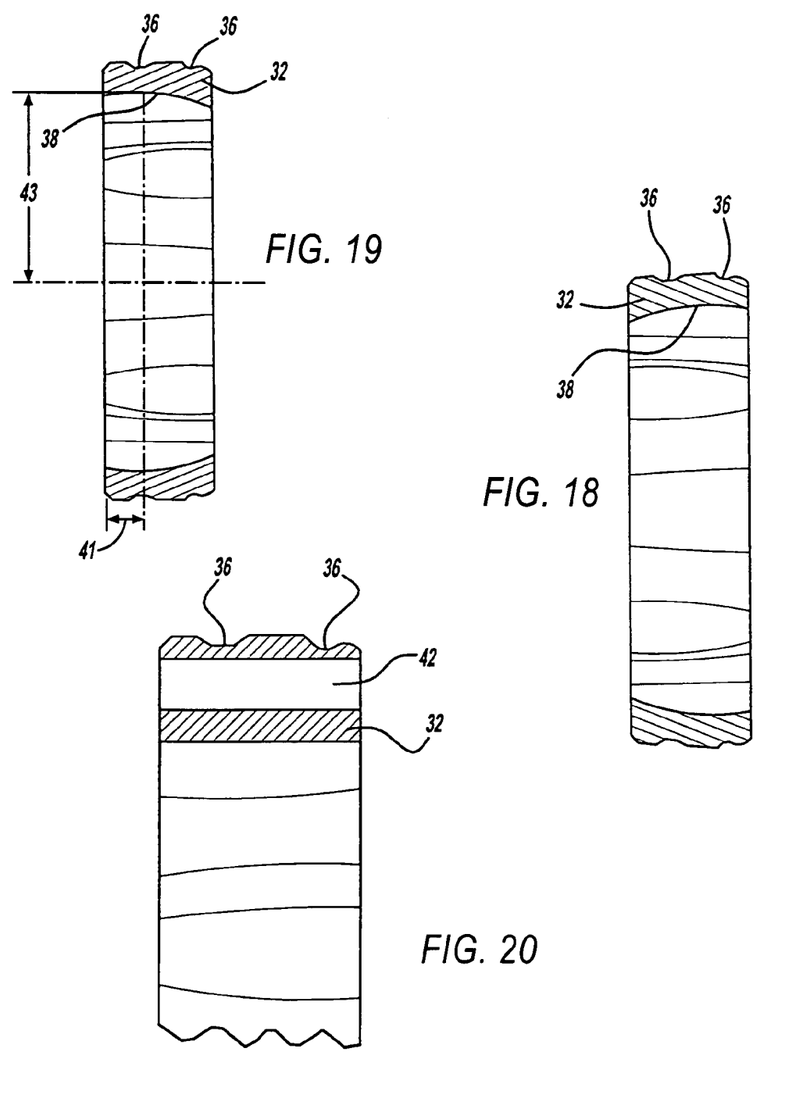
FIG. 18 shows a cross section of the outer race according to the present invention taken along line 18—18 of FIG. 17.
FIG. 19 shows a cross section of an outer race according to the present invention taken along line 19—19 of FIG. 17.
FIG. 20 shows a cross section of the outer race taken along line 20—20 of FIG. 17.
Figures 21, 22, 23:
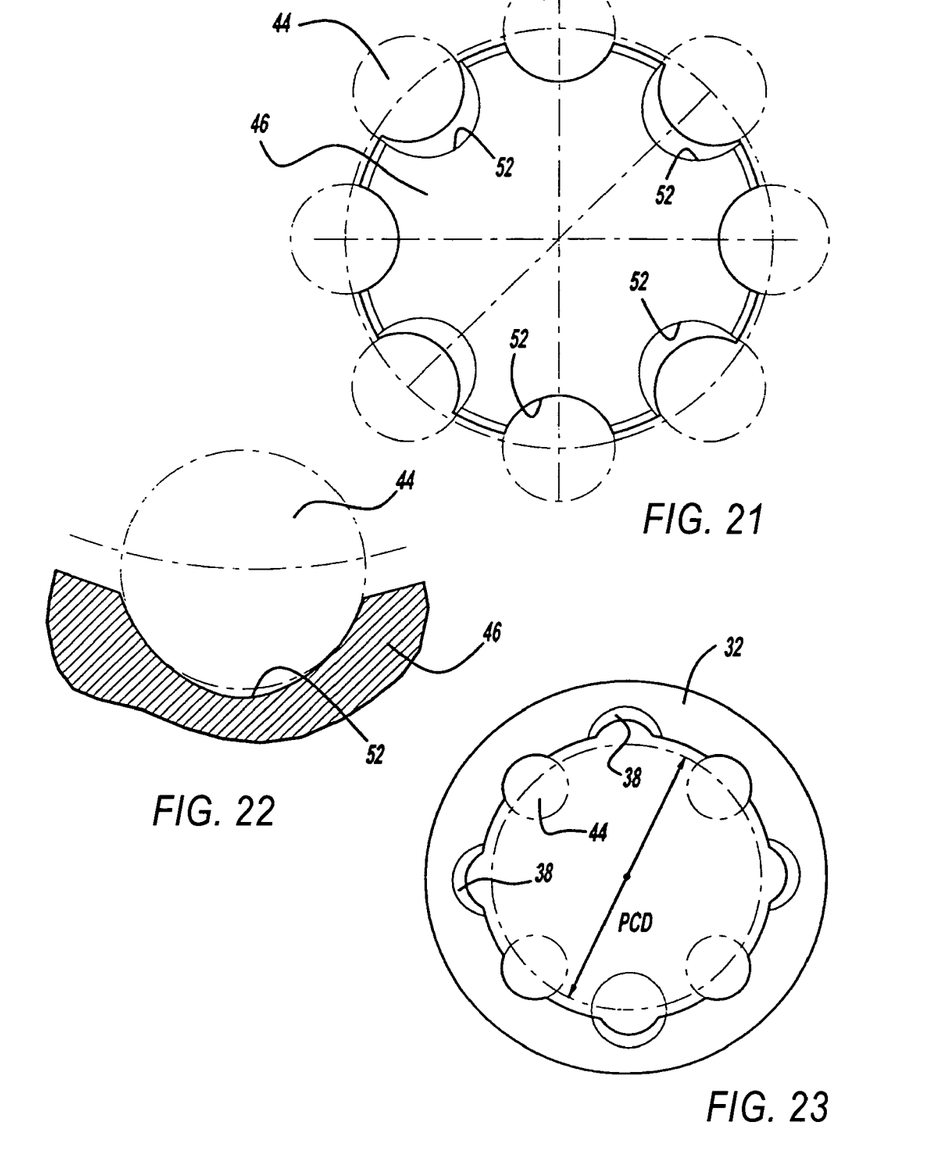
FIG. 21 shows a plan view of the inner race with a plurality of balls set therein.
FIG. 22 shows a close up view of a ball track with a ball therein according to the present invention.
FIG. 23 shows a top view of the outer race with a plurality of balls therein.

The ball tracks 38 on the inner surface of the outer race 32 also are double offset tracks. The double offset tracks 32 incorporate both a radial offset 43 in addition to an axial offset 41. This will flatten the ball tracks 38 and promote rolling, therefore improving efficiency and durability of the constant velocity joint 30. It should be noted that the flattened tracks 38 also result in better track edge support. This permits a higher pressure angle and a closer conformity of the ball 44 to the track 38. This will allow the joint 30 to articulate to a higher angle than that of conventional joints while maintaining superior durability. The axial offset 41 and radial offset 43 (see FIG. 19) have values, that along with the pitch circle diameter (PCD), which is defined as the midpoint of a ball 44 on one side to the midpoint of a ball 44 on the other side through a center point of the joint 30, have predetermined ratios. The predetermined ratios of the axial offset 41, radial offset 43 and the pitch circle diameter (PCD) allow for better ball rolling and increased efficiency of the constant velocity joint 30. It should be noted that in the embodiment shown in the drawings is a four plus four constant velocity joint 30 which has a total of eight balls in the constant velocity joint 30. However, it should be noted that it is contemplated to make a ten ball, six ball, or four ball joint incorporating all of the features of the constant velocity joint 30 according to the present invention.

Figure 7:
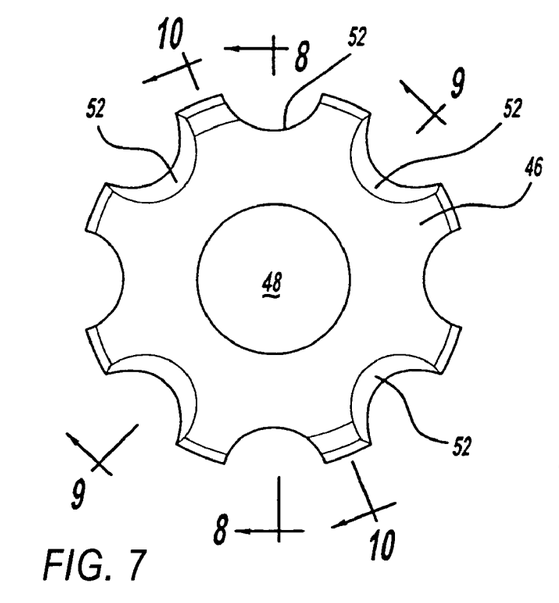
FIG. 7 shows a top view of an inner race according to the present invention.
Figure 8:
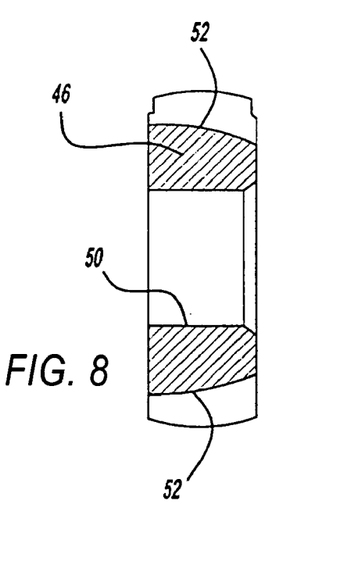
FIG. 8 shows a cross section of the inner race taken along line 8—8 of FIG. 7 according to the present invention.
Figure 9:
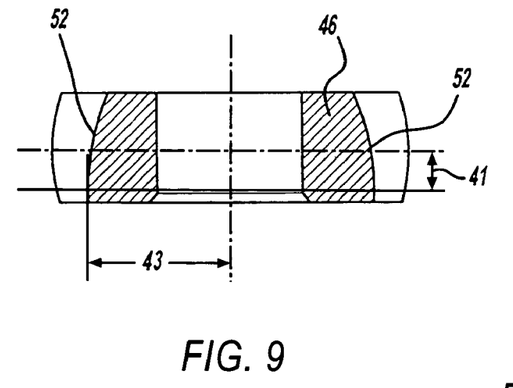
FIG. 9 shows a cross section of an inner race taken along line 9—9 of FIG. 7 according to the present invention.
Figure 10:
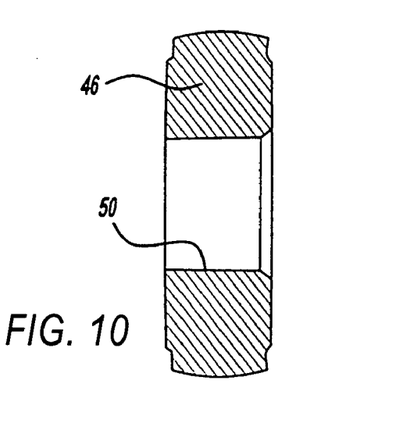
FIG. 10 shows a cross section of an inner race taken along line 10—10 of FIG. 7 according to the present invention.

The constant velocity joint 30 also includes an inner race 46 generally having a circumferential shape. The inner race is arranged within the bore 34 of the outer race 32. The inner race 46 includes an inner bore 48 (see FIG. 7) and has a plurality of ball tracks 52 that are axially opposed. The ball tracks 52 generally have a spherical shape and are aligned with the ball tracks 38 on the outer race 32 such that the axial angle will open in a similar or the same direction as the ball track 38 directly aligned above it on the outer race 32. The ball tracks 52 on the outer spherical surface of the inner race 46 have one half of the ball tracks 52 axially oriented in one way while the other half of the ball tracks 52 are axially oriented in the opposite direction. In the embodiment shown, the ball tracks 52 will open in an alternating pattern around the outer circumference of the inner race 46. The ball tracks 52 with the spherical or elliptical shape on the inner race 46 also include a double offset that includes both a radial offset 43 and an axial offset 41 (see FIG. 9) to promote a flattening of the spherical tracks 52. This leads to improved efficiency and durability of the constant velocity joint 30 as discussed above for the outer race 32. It should be noted that in one embodiment the inner race 46 is made of steel. However, any other, metal composite, hard plastic, ceramic, and the like may also be used.

Figure 11:
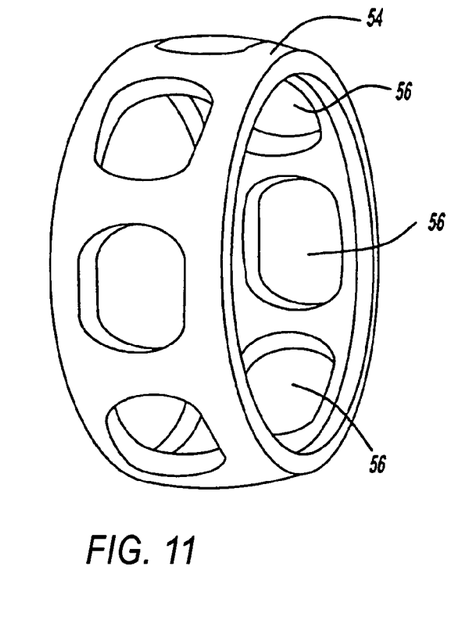
FIG. 11 shows a plan view of a cage according to the present invention.
Figure 12:
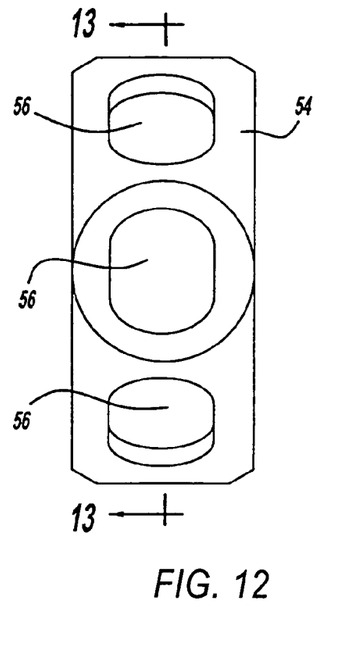
FIG. 12 shows a side view of a cage according to the present invention.
Figure 13:
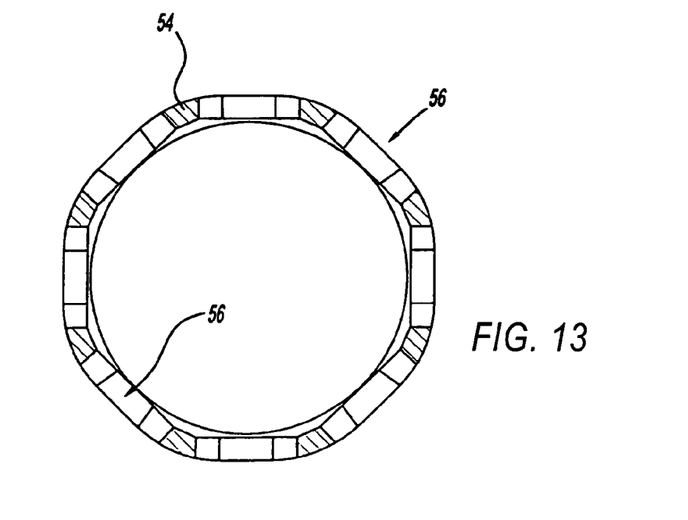
FIG. 13 shows a cross section of the cage according to the present invention taken along line 13—13 of FIG. 12 according to the present invention.
Figure 14:
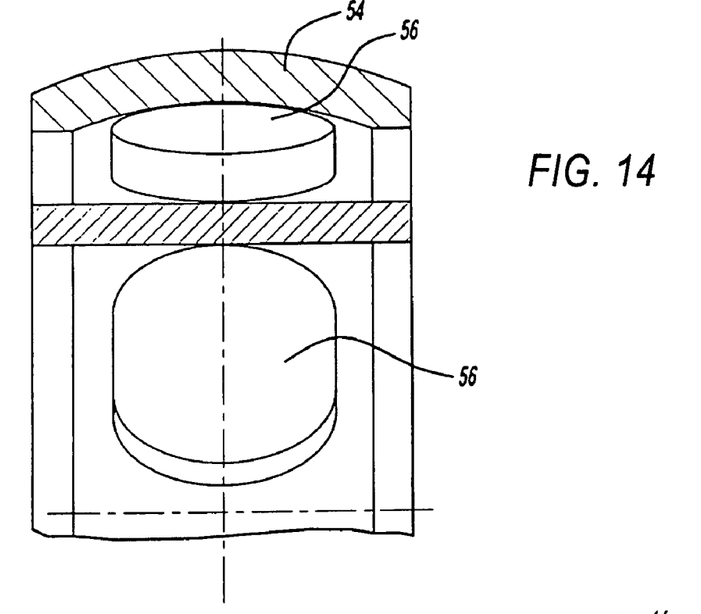
FIG. 14 shows a portion of a cage in partial cross section according to the present invention.
Figure 15:
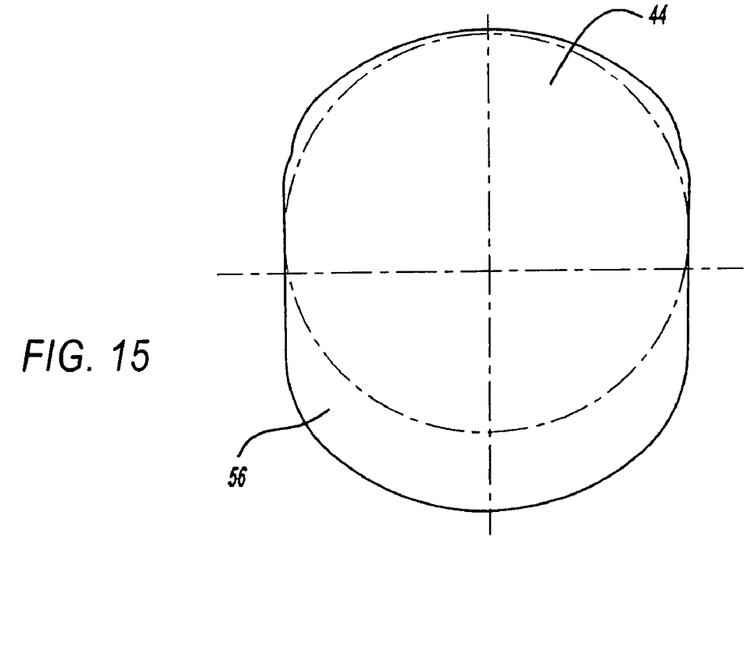
FIG. 15 shows a close up view of an orifice through a cage according to the present invention.

The constant velocity joint 30 includes a roller cage 54 generally having a ring like appearance. The roller cage 54 is arranged within the bore 34 of the outer race 32 such that it is not in contact with the inner surface of the outer race 32. The cage 54 has a plurality of oblong shaped orifices 56 through a surface thereof. The number of orifices 56 will match the number of ball tracks 38, 52 on the outer race 32 and inner race 46 of the constant velocity joint 30. In one embodiment such as that shown in the drawings there will be eight orifices 56 (e.g., see FIG. 11) therethrough. The cage 54 is centered and supported solely by the outer spherical surface of the inner race 46. The use of axially opposed tracks allows the cage 54 to be centered while maintaining a predetermined distance from the edge surfaces of the outer race 32. This insures that the constant velocity joint 30 is symmetrical in nature. This will allow for an approximate 20% efficiency improvement of the constant velocity joint 30. With no contact between the outer race 32 inner surface and the outer surface of the cage 54, efficiency is improved at an approximate rate as noted above, thereby reducing the likelihood of boot and grease thermal failures. The cage 54 is also designed such that it does not have cage grooves that would weaken the cage 54. This allows the inner race 46 to be assembled within the cage 54 without the use of the specialized cage grooves. The cage 54 along with the inner race 46 are preferably made of a steel materials but any other hard metal material, plastic, composite, ceramic, and the like may also be used. The cage 54 in the present invention is nearly in equilibrium and therefore most of the contact loads cancel each other out. This will also help increase the efficiency of the constant velocity joint 30.

The constant velocity joint 30 includes a plurality of balls 44. The balls 44 generally have a larger diameter than balls of traditional CV joints. The larger diameter is permitted since the assembly angle is smaller for the constant velocity joint 30, than for most of the current art. The use of the larger diameter balls 44 also reduces the contact stress on the tracks 38, 52 of the outer race 32 and inner race 46. The larger diameter balls 44 are each arranged within one of the orifices 56 of the cage 54 and within ball tracks 38, 52 of the outer race 32 and of the inner race 46. Therefore, the balls 44 will be capable of rolling in the axially opposed tracks 38, 52 aligned in the same direction. The use of the double offset means that the radial path the balls travel is shallower thus allowing for a higher angle in a smaller, lighter constant velocity joint 30.

Figure 3:
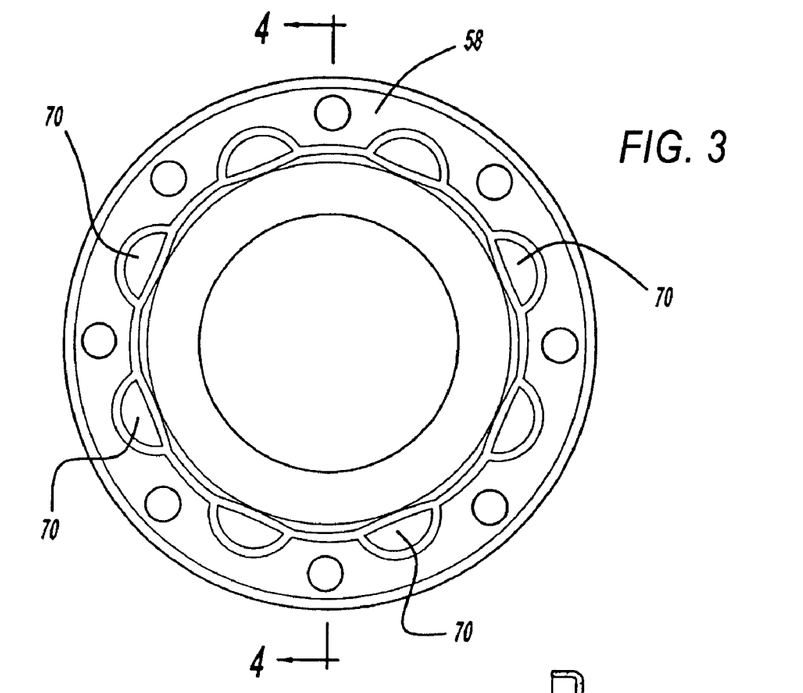
FIG. 3 shows a top view of a grease cap according to the present invention.
Figure 4:
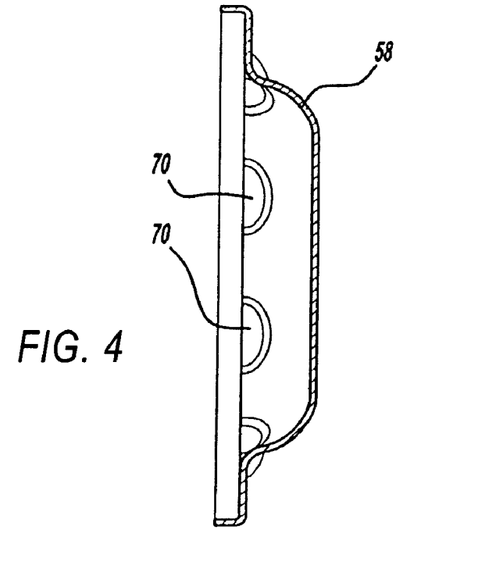
FIG. 4 shows a cross section taken along line 4—4 of FIG. 3 of a cover according to the present invention.
Figures 5, 6:
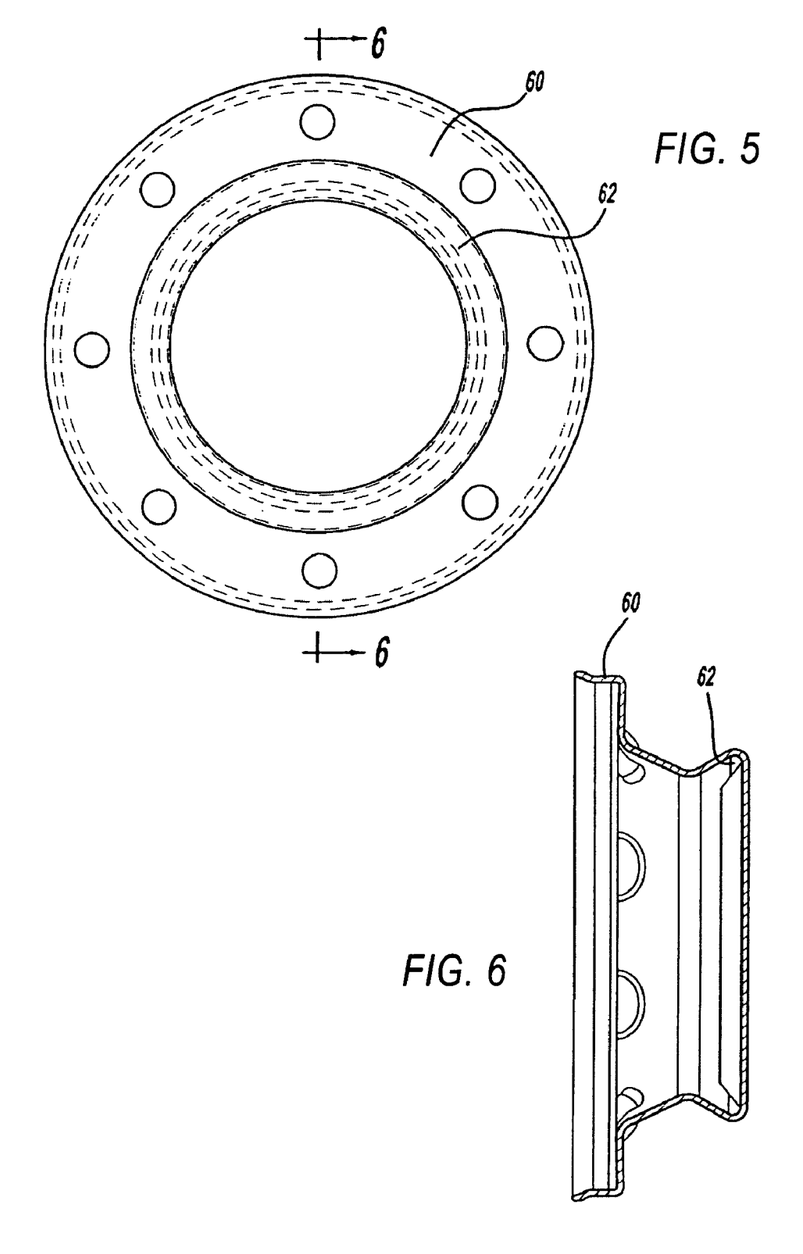
FIG. 5 shows a top view of a boot cover according to the present invention.
FIG. 6 shows a cross section taken along line 6—6 of FIG. 5 of a boot cover according to the present invention.

The constant velocity joint 30 uses a grease cap 58 on one end. The grease cap 58 generally has a cup shaped appearance. The grease cap 58 is generally made of a metal material. However, any, plastic, rubber, ceramic, composite material, and the like may also be used. The cap 58 is press fit or connected to the outer surface of the outer race 32 via one of the circumferential channels 36 on the outer surface. However, any other securing method known may also be used such as fasteners, bonding, etc. The grease cap 58 will insure the grease, which is used as a lubricant, will remain within the constant velocity joint 30. A vent may be placed through the cap 58 to relieve any internal pressure. As shown in FIGS. 3 and 4 the cap also includes a plurality of grooves 70 to allow for rotation of the balls 44 within the constant velocity joint 30 at the high angles.

On an end opposite of the grease cap 58 of the outer race 32 is located a boot cover 60 which generally has a circumferential shape. The boot cover 60 is connected to an outer surface of the outer race 32 either via a circumferential channel 36 on an outer surface thereof or by any other known securing means. The boot cover 60 includes a circumferential channel 62 at an end opposite of the end connected to the outer race 32 for securing a pliable boot 64 therein. The boot cover 60 is generally made of a metal material however any plastic, rubber, ceramic, composite, and the like may be used.

A pliable boot 64 is secured between the boot cover 60 and the shaft 66 of the constant velocity joint 30. Any known securing method can be used to hold the boot 64 around the shaft 66 such as a boot clamp, fastener, etc. The pliable boot 64 is generally made of a urethane material. However, any other pliable material such as fabric, plastic, or rubber may also be used for the constant velocity joint boot 64 as long as it is capable of withstanding the high temperature and high rotational speeds of the constant velocity joint 30. It should be noted that the boot 64 is arranged such that the boot 64 is set within the outer circumference of the cage 54. This will allow the boot 64 to move closer to the center line of the constant velocity joint 30 thus decreasing the package size and reducing the stress on the boot 64 and hence reducing the likelihood of boot failure and constant velocity joint failure. FIG. 1 shows the constant velocity joint 30 at an equilibrium position and shows the boot 64 within the outer diameter of the cage 54. FIG. 2 shows the boot 64 when the constant velocity joint 30 is at a high angle, i.e., approximately 15 degrees. The boot 64 is still within the outer diameter of the cage 54 while also being closer to the center line of the joint 30, thus reducing any boot stress.

Stub shaft 66 is fixed, via splines 50, to the inner race 46 of the constant velocity joint 30. The stub shaft 66 generally is solid and is usually welded to a tube 68 on one end thereof. The stub shaft 66 and propeller shaft tube will pass through the inner bore 34 of the outer race 32 during the event of a collision thus reducing the forces in the collision and absorbing energy as it collapses. It should be noted that in one aspect, the pitch circle diameter (PCD) and the size of the balls 44 are predetermined in such a way to allow a balance to occur such that the inner race 46 and balls 44 will plunge from the outer race 32 during a crash incident, thus allowing the shaft 66 and tube-like members to collapse therein.

The axially opposed ball tracks 38 and 52 are aligned on the outer race 32 and inner race 46 in construction with the double offsets. The removal of the outer race spherical contact surfaces and the judicious choice of the PCD and ball size permit a large improvement in efficiency while also improving durability. Predetermined ratios are contemplated with the constant velocity joint 30 as described above. A ratio C1 which is the ball diameter divided by the pitch circle diameter should be greater than or equal to 0.217 but less than or equal to 0.275 in an eight ball unit as shown here. However, in a three plus three joint the C1 ratio could be greater than or equal to 0.217 and less than or equal to 0.318. It should be noted that if the C1 ratio is too large there will be a reduction in the cage 54 and inner race 46 strength and a loss of efficiency due to increased ball 44 sliding during the constant velocity joint 30 movement. However, if the ratio C1 is too small problems associated with assembling the inner race 46 into the cage 54 will occur. Furthermore, there will also be durability problems due to a lack of track edge support and reduced ball diameter. The lower ratio promotes ball rolling and thus increases efficiency of the constant velocity joint 30.

A ratio X1 is defined as the axial offset divided by the pitch circle diameter and should be within the range of greater than or equal to 0.06753 while being less than or equal to 0.135. If the X1 ratio is too big the constant velocity joint 30 will lose efficiency due to higher ball and cage forces. The larger variation of the ball path may also force an increase in the outside diameter of the outer race 32 to maintain adequate strength of the constant velocity joint 30. The larger ratio may also reduce track edge support at larger articulation angles as found in many current sport utility vehicles (SUVs). However, if the X1 ratio is too small there will be inadequate steering forces thus inhibiting the correct operation of the constant velocity joint 30. Additionally, a small X1 ratio tends to flatten the track and promotes better rolling behavior thus improving the efficiency of the constant velocity joint 30.

Yet another ratio Y1 which is defined as the radial offset divided by the pitch circle diameter should be greater than or equal to 0.188. If this Y1 ratio is too small a larger variation of the ball path may force an increase in the outside diameter of the outer race 32 to maintain adequate strength of the constant velocity joint 30. A small Y1 ratio may also reduce track edge support at larger articulation angles thus reducing the durability of the constant velocity joint 30. A larger Y1 ratio flattens the track and improves efficiency by promoting better rolling behavior of the balls 44.

Therefore, the present invention of a high angle, high speed constant velocity joint 30 uses a combination of innovations to create a smaller, more reliable and more efficient joint. The constant velocity joint 30 has a smaller part package given a set capacity, while also reducing the weight of the constant velocity joint 30. The constant velocity joint may be at least twice as efficient as the standard high angle joint and will be more reliable thus increasing satisfaction of automotive manufacturers while reducing the number of joint failures and warranty issues thereafter. It should be noted that various parameters such as the radial offset 43, the axial offset 41 and the pitch circle diameter (PCD) may be adjusted to achieve specifically tuned objectives for the constant velocity joint 30 such as but not limited to the amount of articulation angle needed or required for the constant velocity joint 30 in the drive train system. The use of the smaller diameter and reduced width outer race 32 will also reduce the cost and complexity of assembling the constant velocity joint 30 for the automotive manufacturers thus reducing overall costs of the automotive vehicle. Hence, the high angle, i.e., greater than or equal to nine degree, high speed fixed constant velocity joint 30, has a better efficiency and more reliability than conventional high speed constant velocity joints that run at high temperatures thus causing premature boot and grease failures. The problem of temperature-based boot failures increases at higher angles, hence the current design limitations of the conventional constant velocity joint need to be corrected to increase joint reliability and satisfaction. The higher temperatures and speed will produce higher stresses on the boot and contribute to many early failures of the constant velocity joint. Therefore, the present invention of the high speed, high angle constant velocity joint 30 overcomes these problems by the elimination of the spherical cage support surface on the outer race 32 in combination with a plurality of axially opposed tracks 38, 52 each of the tracks 38, 52 having a double offset therein. This will allow for high angles while also promoting better efficiency and durability of the constant velocity joint 30 via better ball rolling within the joint 30.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A constant velocity joint, comprising:
   an outer race having a bore with an inner surface;
   a cage arranged within said bore of said outer race;
   an inner race having an outer surface; and
   a plurality of balls arranged within said cage; and
   a shaft connected to said inner race;
   a boot having a portion positioned within said cage;
   wherein said inner race is adapted to support and center the cage and said cage remains in an unsupported state with said outer race when said shaft is in an angled position.

2. The constant velocity joint according to claim 1, wherein:
   the outer race has a plurality of outer tracks disposed on the inner surface of the outer race; and
   the inner race has a plurality of inner tracks disposed on the outer surface of the inner race;
   wherein the outer tracks and the inner tracks have an axial offset.

3. The constant velocity joint according to claim 2, wherein the axial offset of the outer tracks or the inner tracks divided by a pitch circle diameter of the plurality of balls is greater than or equal to 0.06753 and less than or equal to 0.135.

4. The constant velocity joint according to claim 2, wherein the outer tracks and the inner tracks have a radial offset.

5. The constant velocity joint according to claim 4, wherein the radial offset divided by a pitch circle diameter of the plurality of balls is greater than or equal to 0.188.

6. The constant velocity joint according to claim 4, wherein the plurality of balls have a pitch circle diameter; and the radial offset, the axial offset, and the pitch circle diameter are configured to achieve a desired articulation angle.

7. The constant velocity joint according to claim 6, wherein the radial offset and axial offset are adapted to provide flattened outer and inner tracks relative to outer and inner tacks of a constant velocity joint without radial or axial offsets.

8. The constant velocity joint according to claim 1, further comprising:
   a boot cover contacting said outer race; and
   said boot arranged between said boot cover and said shaft.

9. The constant velocity joint according to claim 8, further comprising a cap secured to said outer race on a side opposite said boot cover.

10. The constant velocity joint according to claim 1, wherein said shaft has an operating angle greater than or equal to 9 degrees.

* * * * *